United States Patent [19]

Kanayama et al.

[11] 4,451,749

[45] May 29, 1984

[54] AC GENERATOR

[75] Inventors: Kenji Kanayama, Kariya; Hidekuni Sugi, Nagoya; Shuzo Kinkori, Okazaki; Kouzi Kawasumi, Nagoya, all of Japan

[73] Assignee: Nippondenso Co., Ltd., Kariya, Japan

[21] Appl. No.: 411,361

[22] Filed: Aug. 25, 1982

[30] Foreign Application Priority Data

Sep. 11, 1981 [JP] Japan .................. 56-144436
Nov. 13, 1981 [JP] Japan .................. 56-182745

[51] Int. Cl.³ .................................................. H02K 9/06
[52] U.S. Cl. .................................... 310/62; 310/63;
310/89; 310/156; 310/208; 310/268
[58] Field of Search ............ 310/156, 91, 268, 64,
310/89, 65, 257, 198, 180, 199, 184, 200, 114,
201, 57, 202, 58, 203, 62, 204, 63, 205, 206, 207, 208

[56] References Cited

FOREIGN PATENT DOCUMENTS 5182319 7/1976 Japan .
5580209 6/1980 Japan .

*Primary Examiner*—R. Skudy
*Attorney, Agent, or Firm*—Cushman, Darby & Cushman

[57] ABSTRACT

An AC generator includes a pair of cup-shaped housings to accomodate a stationary armature coil and a rotor. The armature coil includes a multiphase windings formed in a flat annular shape having flat surfaces perpendicular to the axis of a rotating shaft of the AC generator, and the flat annular-shaped armature coil is mounted on the pair of cup-shaped housings with the outer peripheral portion of the armature coil fixed between the pair of housings. The rotor includes a pair of discs of magnetic material fixed to the rotating shaft spaced from and opposed to each other interposed therebetween by the flat annular-shaped armature coil. Each of the discs has a plurality of permanent magnets arranged concentrically with the rotating shaft in alternate magnetic polarities on one surface of the disc facing the armature coil, so that magnetic fluxes which rotate with the discs and which link with the stationary armature coil are produced between opposed permanent magnets of the pair of discs. The longitudinal size of the AC generator is reduced to achieve a compact AC generator.

20 Claims, 17 Drawing Figures

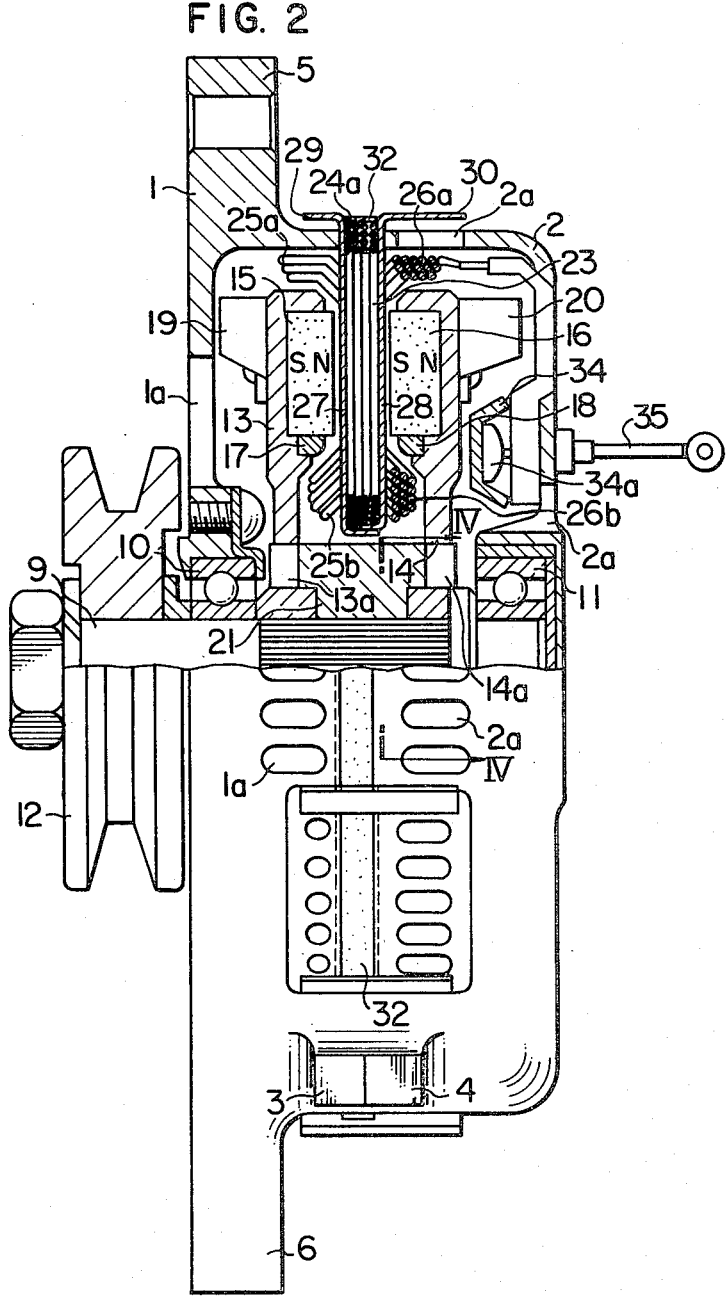
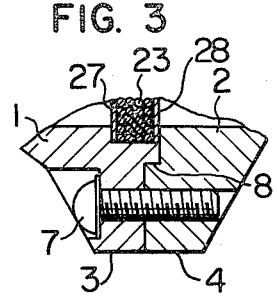
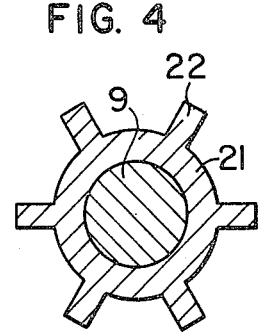
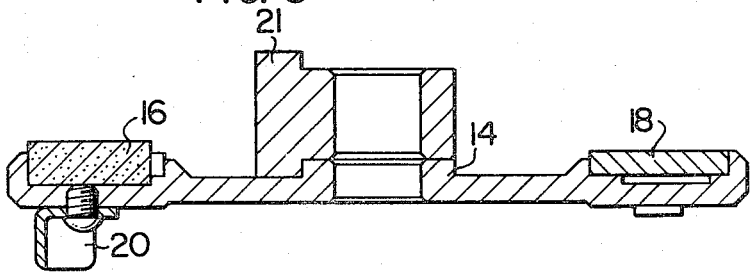
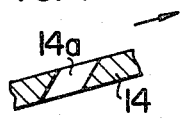

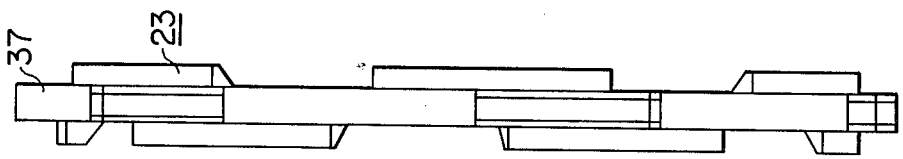
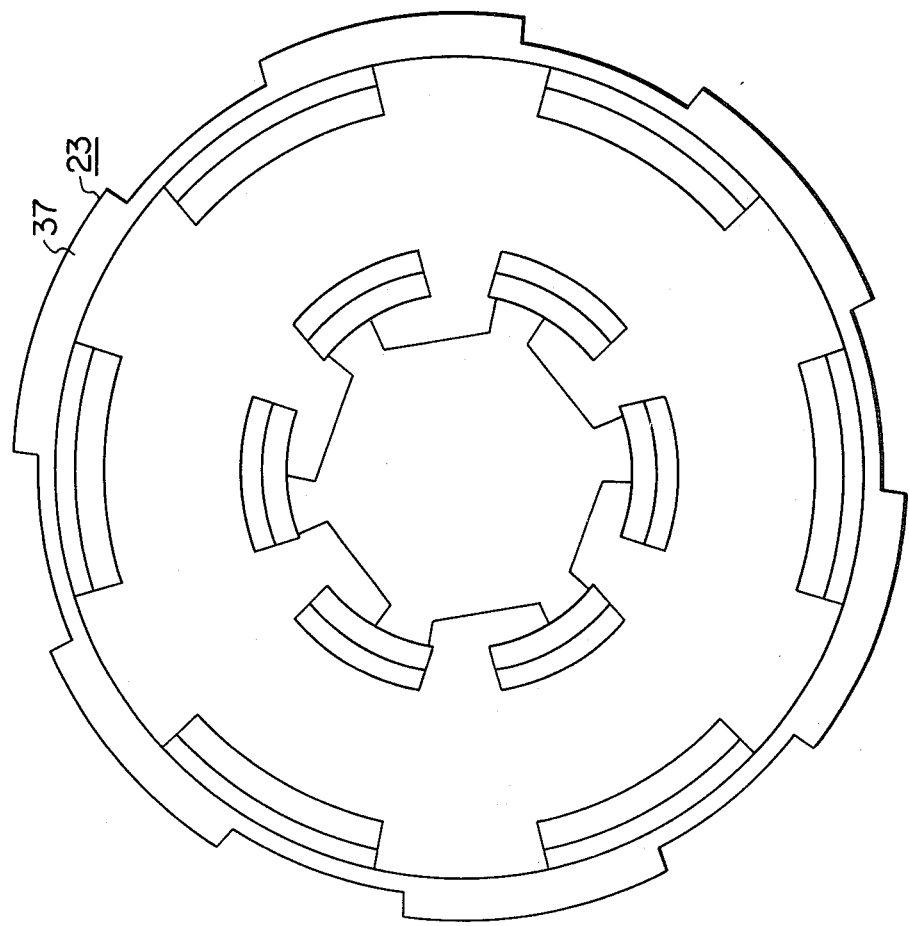

AC GENERATOR

BACKGROUND OF THE INVENTION

The present invention relates to an AC generator (alternator) driven by a prime mover, and more specifically, to an AC generator for vehicles and a three-phase AC generator for domestic use.

Conventional AC generators generally include a rotor core having pawls of Randel-Pole type wound with an exciting coil and include a multiphase armature coil surrounding the rotor core. In such a construction, it is impossible to reduce the size of or to flatten such AC generators beyond a certain limit.

SUMMARY OF THE INVENTION

In view of the above-mentioned problems, an object of the present invention is to provide a generator with an axial length remarkably reduced and an output per unit weight greatly improved as compared with the conventional AC generators.

According to the present invention, there is provided an AC generator in which the multiphase coil is fixed as an annular armature coil on the housing, and a magnet opposed to each of the flat annular portions of the armature coil is fixed on a disc rotating on each side of the armature coil, thereby reducing the size and weight of the AC generator.

BRIEF DESCRIPTION OF THE DRAWINGS

FIG. 2 is a sectional view taken along the line II—II in FIG. 1.

FIG. 3 is a sectional view taken along the line III—III in FIG. 1.

FIG. 4 is a sectional view of a blower fan taken along the line IV—IV in FIG. 2.

FIG. 7 is a sectional view taken along the line VII—VII in FIG. 5.

FIG. 8 is a sectional view taken along the line VIII—VIII in FIG. 5.

FIG. 16 is a front view of an armature coil covered with a shield layer.

FIG. 17 is a side view of the armature coil shown in FIG. 16.

DESCRIPTION OF THE PREFERRED EMBODIMENTS

Figure 1:
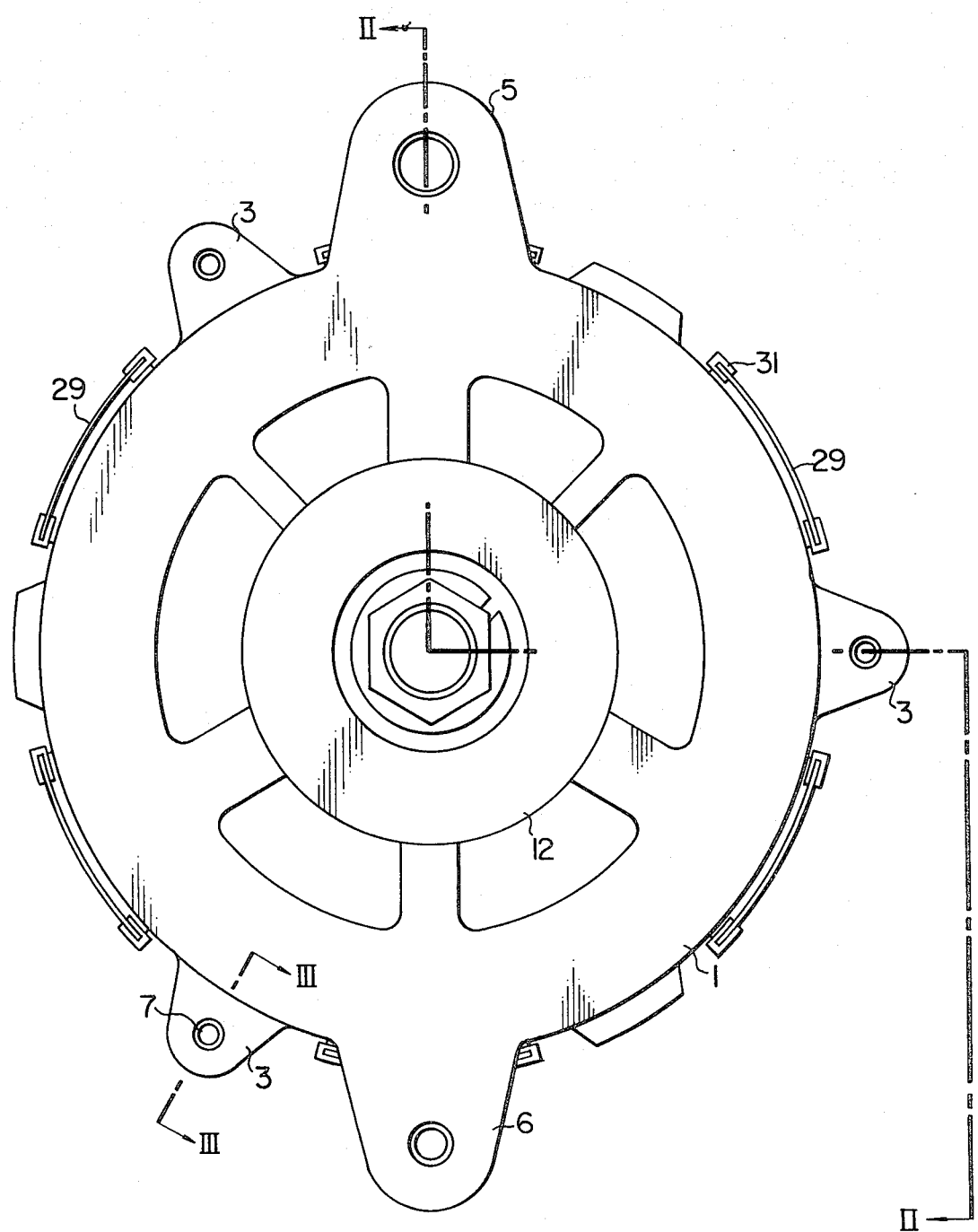
FIG. 1 is a front view of an AC generator according to an embodiment of the present invention.

In FIGS. 1 to 11 showing a first embodiment of the present invention, reference numerals 1 and 2 designate a pair of cup-shaped housings, which have a plurality of air holes 1a, 2a respectively in the sides and outer peripheral portions thereof to flow in and out the cooling air by the operation of a fan as described later. Each housing also includes three mounting portions 3 and 4 protruded outwardly, and the housings are coupled to each other by bolts 7 as shown in FIG. 3. Each of the mounting portions 3 and 4 has a socket and a spigot (as a faucet joint 8) to define relative positions of the housings 1, 2.

Numeral 9 designates a rotating shaft supported rotatably on the housings 1, 2 by bearings 10, 11. A pulley 12 is secured to the rotating shaft 9 on the side of one housing 1. Numerals 5 and 6 designate flanges provided on the housing 1 for mounting on, for example, a vehicle engine, the pulley 12 being driven by the vehicle engine through a belt (not shown). Numerals 13, 14 designate a pair of discs made of magnetic material, for example, iron, secured to the rotating shaft 9.

Figure 5:
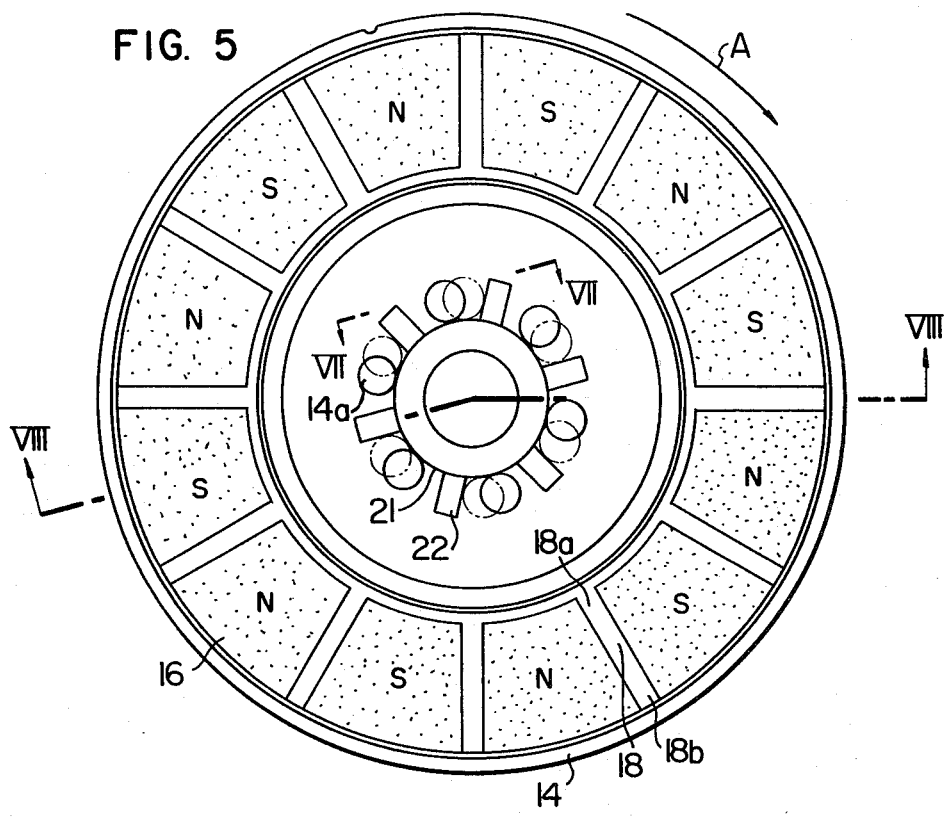
FIG. 5 is a front view of a disc fixed with magnets.

A two sets of a plurality of permanent magnets 15 and 16 are respectively fixed in annular fashion on the outer periphery portions of one side of the discs 13 and 14 as shown in FIGS. 2 and 5.

The permanent magnets 15, 16 on respective discs 13, 14 are arranged at alternate different polarities along a concentric line of each disc and are separated by spacers 17, 18 of non-magnetic material, aluminum therebetween and fixed by a bonding agent. The spacers 17, 18 are fitted in gaps (slots) between the magnets 15, 16 and are positioned in the troughs lower than the magnets 15, 16 in axial direction and radially with respective to the rotating shaft 9. When the rotating shaft 9 rotates in the presence of the spacers 17, 18, therefore, the slots between the magnets function as a centrifugal fan, so that air flows from the inner periphery 18a (FIG. 5) of the spacers 17, 18 to the outer periphery 18b thereof.

Numerals 19, 20 designate centrifugal fans for blowing the cooling air through the air holes 1a, 2a mounted with bolts on the discs 13, 14. Numeral 21 designates a fan arranged between the pair of the discs 13, 14 and fixed on the rotating shaft 9, which fan has a plurality of radially extending blades 22.

Numerals 13a and 14a designate through holes formed in the discs 13, 14 and have an end opened to the space surrounded by the pair of the discs 13, 14, which opening is positioned between adjacent blades 22 of the fan 21. The other end of the through holes 13a, 14a is opened to the outside of the discs 13, 14, which opening is positioned on the leading side of rotation of the discs as compared with the inner opening. The through holes 13a, 14a are thus inclined as shown in FIG. 7 to facilitate the sucking of air during the rotation of the discs 13, 14. The blades 22 work to discharge in radial direction the air sucked from the through holes 13a, 14a thereby to cool the armature coil described later.

Figure 6:
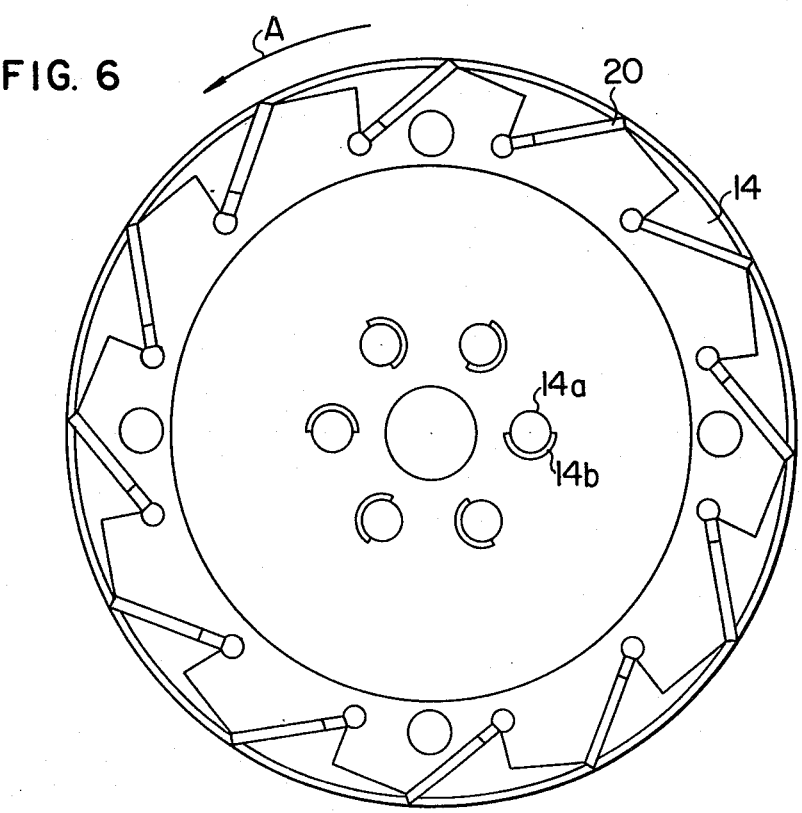
FIG. 6 is a rear view of the disc shown in FIG. 5.
Figure 10:
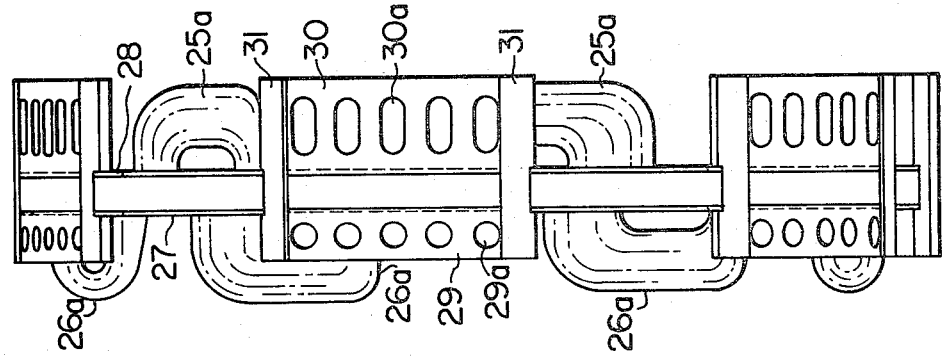
FIG. 10 is a side view of the armature coil shown in FIG. 9.

Semicircular protrusions 14b for guiding the air are formed in the vicinity of the through holes 13a, 14a on the outside of the discs 13, 14 on the lagging side of the rotational direction of the discs 13, 14 (shown by the arrow A in FIG. 6).

Figure 15:
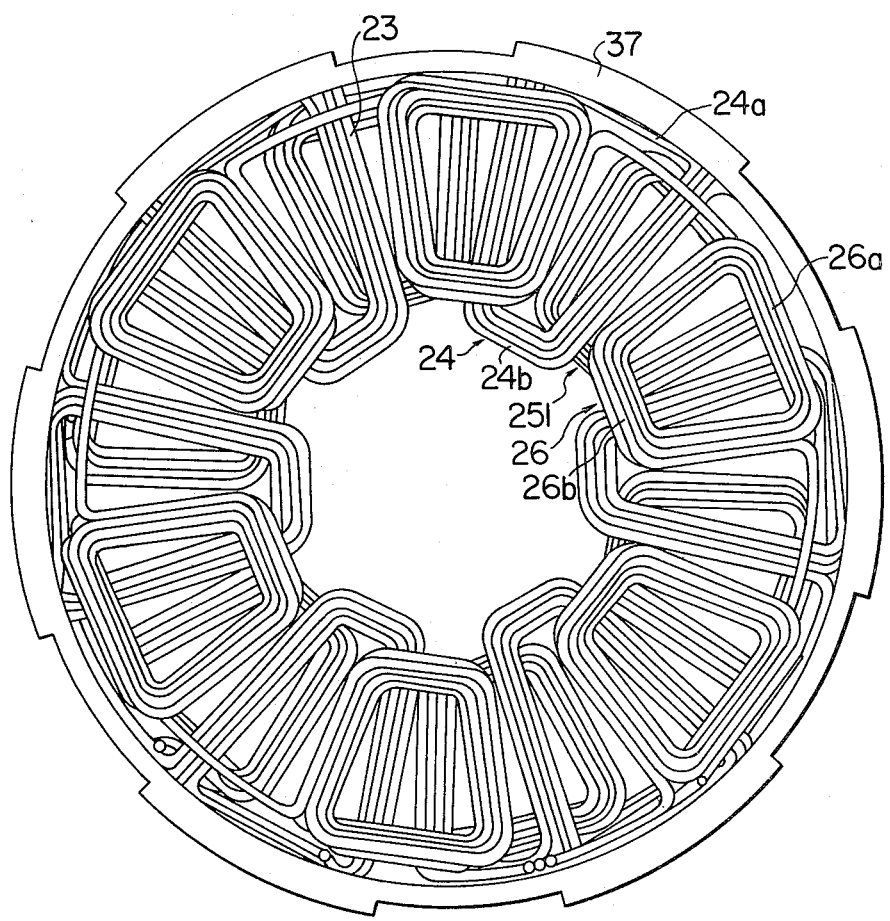
FIG. 15 is a front view of an armature coil.

Numeral 23 designates an annular multiphase armature coil formed by winding a wire having a ceramic insulation layer thereon and making up a magnet wire as disclosed in Japanese Patent Laid-Open Publication No. 55-80209 (1980), which armature coil 23 has annular, substantially flat portions on both sides thereof opposed in the axial direction along the rotating shaft 9. The armature coil 23 shown in this embodiment is a three-phase coil, and the coil of each phase has six winding portions 24, 25, 26 arranged equidistantly in a circumferential direction as best seen in FIG. 15 showing a second embodiment of the present invention.

The armature coil 23, which is the same for both the first and second embodiments of the present invention, will be described in detail with reference to FIG. 15. The outer peripheral portion 24a and the inner peripheral portion 24b of the winding portions 24 of a first phase extend straight radially beyond the flat portions of the coil 23, while the outer peripheral portions 25a, 26a of the winding portions 25, 26 of second and third phases are bent in a direction substantially perpendicular to the plane containing the flat annular portions of the armature coil 23 outside thereof, as best seen in FIG. 2. The inner peripheral portions 25b, 26b of the winding portions 25, 26 of the second and third phases, on the other hand, are bent outwardly on the inside of the flat annular portions.

Referring again to FIGS. 1 to 11 showing the first embodiment, the armature coil 23 is sandwiched by a pair of annular metal plate 27, 28 in contact with the flat annular portions and is inseparably coupled with the metal plates 27, 28 in a manner mentioned later before being fixed on the housings (FIG. 9, FIG. 10).

Figure 12:
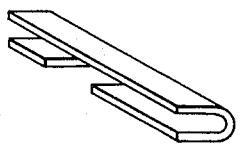
FIG. 12 is a perspective view of a modification of the coupling member shown in FIG. 11.
Figure 14:
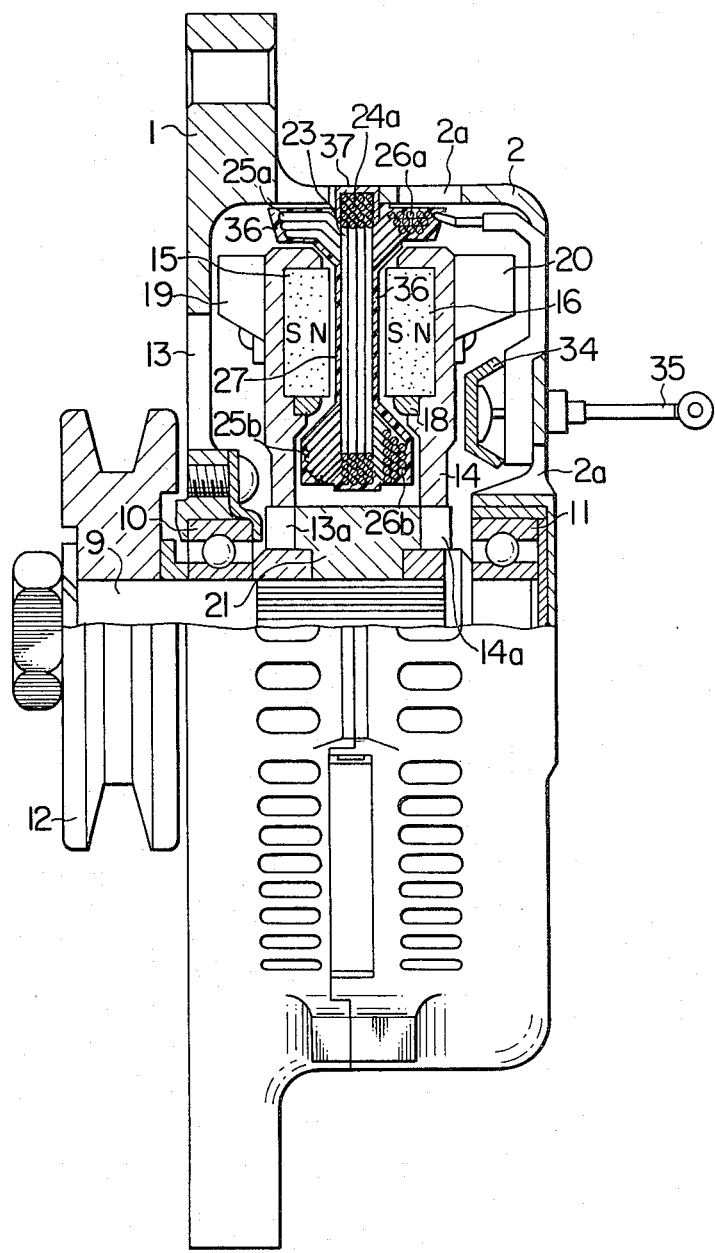
FIG. 14 is a partially-cutaway sectional view of an AC generator according to a second embodiment of the present invention.

A plurality of heat-radiating fins 29, 30 extending outward and having leading ends bent substantially at right angles are arranged integrally and equidistantly in circumferential direction on the outer periphery of the metal plates 27, 28. As seen from FIGS. 10 and 11, the heat-radiating fins 29, 30 of the metal plates 27, 28 are coupled to each other by coupling members 31, which may take the form as shown in FIG. 12.

Figure 9:
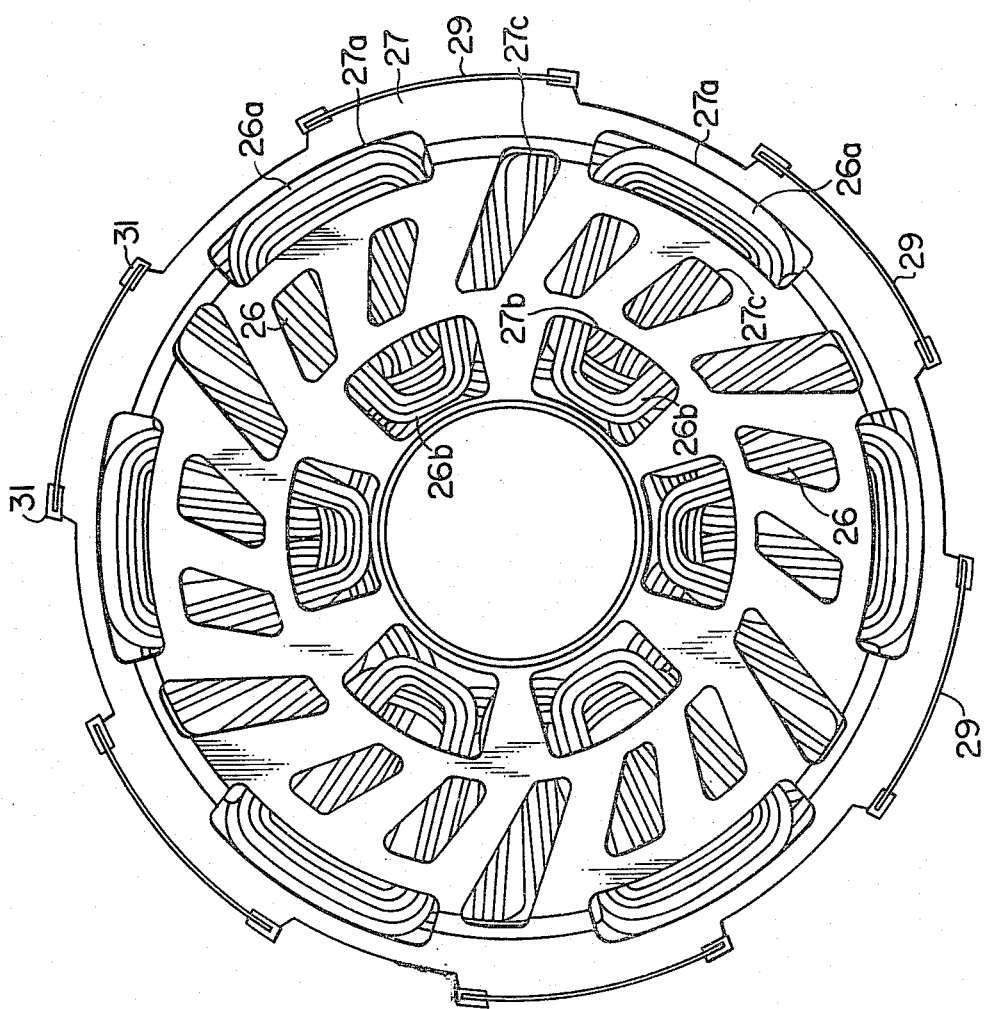
FIG. 9 is a front view showing an armature coil held by metal plates.
Figure 11:
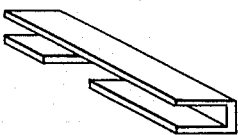
FIG. 11 is a perspective view of a coupling member for coupling a pair of the metal plates shown in FIG. 9.

The annular metal plate 27, as shown in FIG. 9, has apertures 27a, 27b so that the bent outer peripheral portion 26a and inner peripheral portion 26b of the winding portions 26 of third phase extend therethrough outward of the metal plate 27. Further, the metal plate 27 is formed with a plurality of slits 27c at portions thereof in contact with the flat annular portion of the armature coil 23, which slits 27c are inclined to facilitate the discharge of the cooling air along the outer peripheral direction. The slits 27c also function to inhibit an eddy current generated in the metal plate 27. The other annular metal plate 28 also has similar apertures and slits. The heat-radiating fins 29, 30 are provided with a plurality of air holes 29a, 30a in order to smooth the flow of the cooling air outwardly through the air holes 1a, 2a formed in the housings 1, 2 from the inside thereof as seen from FIG. 10.

The armature coil 23 integrally coupled to the metal plates 27, 28 is fixed on the housings 1, 2 as seen from FIG. 2, and the outer peripheral portion 24a of the winding portion 24 extending straight outward is held at the inner ends of the housings 1, 2. In this way, the armature coil 23 is securely fixed on the housings 1, 2 while at the same time reducing the diametrical length of the housings.

Although the metal plates 27, 28 are in close contact with the armature coil 23, a heat-resistant insulation resin layer is provided by powder coating on the back of the metal plates 27, 28 which are in contact with the armature coil 23. The insulation layer may take the form of an inorganic insulation plate such as a mica plate, a ceramic plate or an epoxy resin plate, or alternatively, an insulation layer of other resins or ceramics (metal oxide) may be coated or formed by melt spray coating.

Further, as shown in FIG. 2, the outermost peripheral portion of the metal plates 27, 28 is coated with a silicone varnish 32 similar to ceramics in a manner to cover the outer periphery of the armature coil 23.

Numeral 34 designates a cooling fin fixed to the housing 2, and numeral 34a one of thyristors mounted on the cooling fin 34. A total of six thyristors 34a are connected in a bridge on the cooling fin 34, so that the three-phase AC output of the armature coil 23 is full-wave rectified. The gate of each thyristor is supplied with a gate pulse from a voltage regulator not shown thereby to control the phase of the firing angle of the thyristors 34a, with the result that the effective value of a DC output voltage full-wave rectified is maintained substantially constant regardless of the rotational speed of the rotating shaft 9.

Since this phase control circuit using a thyristor bridge is well known and may employ various circuit configurations, a circuit diagram thereof is not attached hereto.

The full-wave rectified output of the thyristors 34a is delivered through a cord 35 and is used to charge a vehicle-mounted battery and to supply power to an electric load such as an ignition system or a head lamp not shown. (The present invention is not limited to the construction for producing a DC output but may use AC power directly.)

In this configuration, as the permanent magnets 15, 16 rotate with the iron discs 13, 14, rotating main fluxes produced by the permanent magnets 15, 16, laterally in FIG. 2 and also connecting the permanent magnets 15, 16 to each other are cut by the stationary armature coil 23 which supplies three-phase AC power to the voltage-regulated full-wave rectifier including the thyristor bridge 34a.

During this operation, the armature coil 23 is extremely heated. This heat is transmitted via the metal plates 27, 28 and radiated into the atmosphere through the heat-radiating fins 29, 30.

The electrical insulation between the armature coil 23 and the metal plates 27, 28 is secured by a heat-resistant resin layer, an inorganic insulation layer or a melt spray coating of ceramics formed thinly on the inner surfaces of the metal plates 27, 28. As an alternative method, the armature coil 23 may be insulated by an insulation film of the magnet wire.

The armature coil formed by winding a ceramic magnet wire according to the embodiment has a very high temperature tolerance value so that a large current is allowed to flow therethrough irrespective of a small coil diameter. The size of the armature body is thus reduced, and greatly contributing to an increased magnetic flux density of the air gaps G between the permanent magnets 15 and 16. In the generator with a flattened armature, the linking magnetic flux density can be increased considerably, thus making it possible to improve the magnetic efficiency, with the result that a predetermined output voltage or output current can be obtained with a fewer number of turns of armature coil 23.

Since the reactance of the armature coil 23 is reduced, however, the three-phase AC output voltage undesirably increases excessively when the rotating shaft 9 rotates at high speeds. In other words, certain types of generator requires a constant output voltage regardless of the engine speed.

A harmless and useful result is achieved, however, when the maximum temperature of the armature coil 23 is increased by use of a ceramic coil for the armature coil as described above. Specifically, at high temperatures, the resistance of the armature coil 23 increases to such a degree that the efficiency is reduced and no advantage is attained in the conventional generators, whereas in this embodiment the voltage drop due to such a resistance serves to inhibit the output voltage from rising excessively.

Also, in this embodiment, the through holes 13a, 14a provided in the discs 13, 14, the blow fan 21 and the gaps or slots (formed by spacers 17, 18) between the magnets 15, 16 function as a radial fan effectively cooling the armature coil 23.

Figure 13:
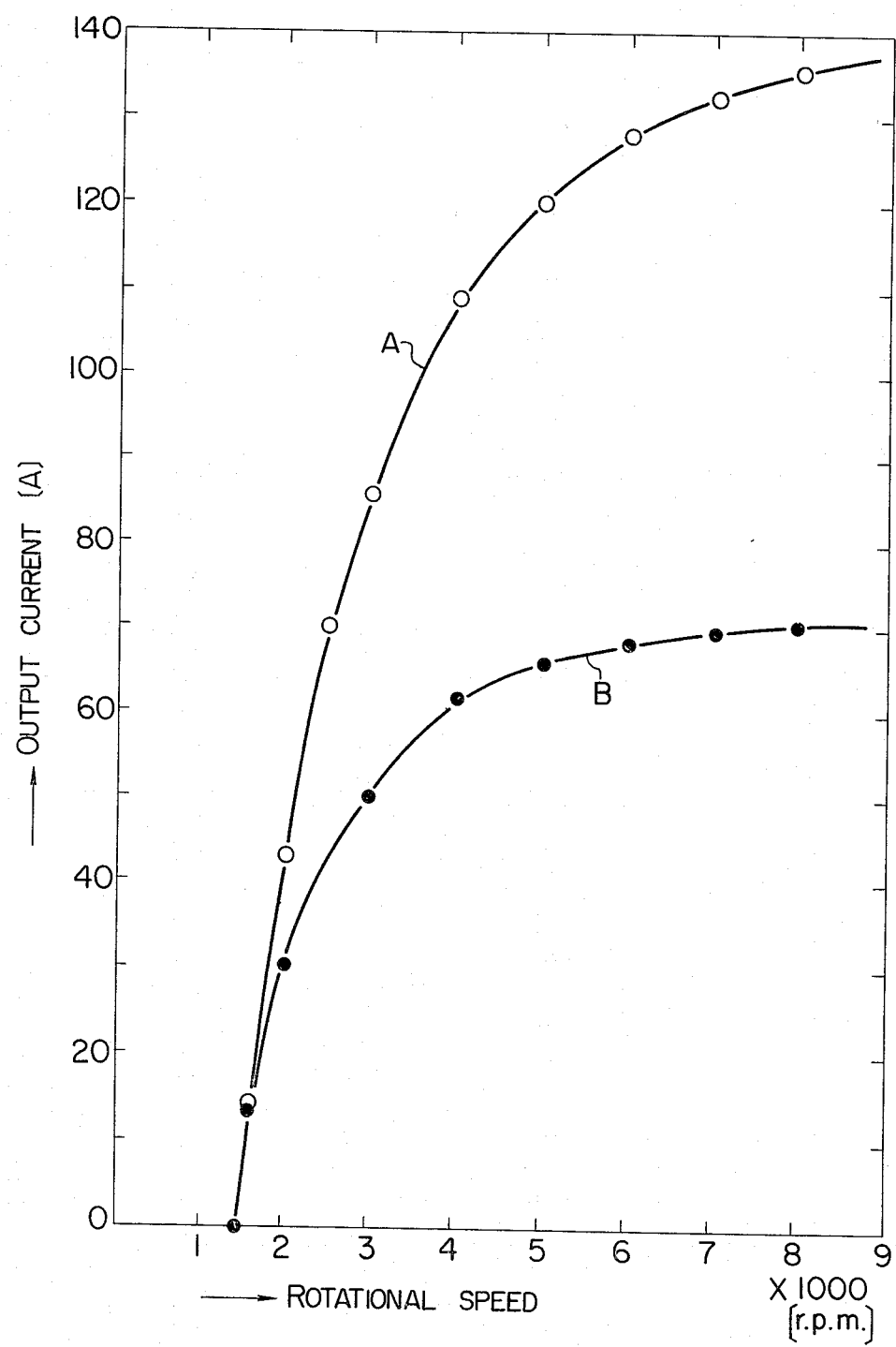
FIG. 13 is a graph showing output characteristics of an AC generator according to the present invention and a conventional AC generator.

A curve A in FIG. 13 represents an output characteristic of the generator in this embodiment and a curve B represents a similar characteristic of a conventional AC generator of substantially the same weight as the generator in this embodiment used for vehicles and of the high speed rotation type. As clear from these curves, the output per unit weight is improved according to the present invention.

The permanent magnets 15, 16 for producing the magnetic field need not be of the segment type but may comprise a pair of integral annular magnets opposed to each other. An electromagnetic coil may be used to produce the magnetic field.

As described above, according to the embodiment of the present invention, strong magnetic fluxes produced between the rotating permanent magnets opposed to each other are linked with a flat armature coil, and the armature coil is held by metal plates on both sides thereof, resulting in a very compact construction and improving in cooling efficiency.

Further, since the armature coil is held, accurately positioned and kept in shape by the metal plates in the housings, the air gaps are minimized and a sufficient mechanical strength is obtained.

Furthermore, the metal plates can resist a very high temperature of the armature coil. Since the metal plates are not easily deformed and is high in durability and thermal conductivity, the armature coil can be effectively cooled.

Now, a second embodiment of the present invention will be explained with reference to FIGS. 14 to 17 with main emphasis placed on the differences from the first embodiment. In the second embodiment, the component elements denoted by the same reference numerals as those in the first embodiment have the same construction and function as those in the first embodiment.

The second embodiment is different from the first embodiment in the manner in which the armature coil 23 is mounted on the housings 1, 2. The armature coil 23 is covered by a shield layer 36 of ceramic material, and the sides of the peripheral portion 24a extending straight outward of the winding portion 24 of the first phase is held by a metal ring 37. The ring 37 has a U-shaped section at the part thereof in contact with the outer peripheral portion 24a. A heat-resistant resin layer is powder coated on the back of the metal ring 37 in close contact with the armature coil 23.

In the second embodiment, the armature coil 23 is molded by the ceramic material 36, the outer peripheral sides of the coil 23 are held by the metal plate 37, and a heat-resistant resin layer is formed between the metal plate 37 and the coil 23, as described above. Instead of this construction including the metal plate 37, the outer peripheral sides of the coil 23 may be molded by ceramic material so that the outer peripheral sides of this ceramic material may be held by the housings 1, 2. In this case, a spring member (not shown) is preferably inserted between the housings 1, 2 and the ceramic material to prevent a crack from being developed in the ceramic material.

In the case where the metal plate 37 is provided, the back side of the metal plate 37 may be coated with a ceramic insulating layer by melt spray (plasma melt spray coating) or a mica plate or other ceramic plate or synthetic resin plate may be inserted for insulation from the coil 23.

The silicone resin containing inorganic fine powder as disclosed in Japanese Patent Laid-Open Publication No. 51-82319 (1976) may be used as the ceramic material making up the molding material for the armature coil 23. This material is a kind of organopolysiloxane containing a silica filler, ceramic powder and a platinum compound making up a silicone varnish component, which if vulcanized, develops into a soft film and further into a ceramic material at high temperatures. If this material is hardened by heating for 5 to 30 minutes at 100° to 200° C., a soft film having a rubber-like elasticity is developed. When this soft film is assembled in the armature and a comparatively large current is supplied through the armature coil 23, the rubber-like soft film develops into a ceramic material by the heat of the armature coil 23.

Even if the ceramic material has not yet been developed at the time of shipment of the generator according to the present invention, the generator may be put in actual use.

Where the heat generated by the armature coil 23 is utilized to develop the molding material into the ceramic material, the armature coil 23 is required to comprise a ceramic coated magnet wire, for example, a copper core wire covered with an organic insulating layer such as polyimide and a ceramic material as disclosed in Japanese Patent Laid-Open Publication No. 55-80209 (1980).

The present invention is not limited to the construction in which the armature coil is molded by the ceramic material. As an alternative, the armature coil may be fixedly held and or molded by a ceramic plate, or by a heat-resistant synthetic resin plate. In the case where a synthetic resin is used, the armature coil cannot be heated to so high a temperature as the ceramic material and therefore the armature coil may take the form other than a ceramic magnet wire.

We claim:
1. An alternating current generator comprising:
 a pair of cup-shaped housings, each including a plurality of mounting portions at the outer peripheral side thereof, said pair of housings being fixed mutually by said mounting portions, each of said housings further including a plurality of air holes for allowing the cooling air to flow in at the bottom thereof and a plurality of air holes for blowing out the cooling air at the peripheral edge thereof;
 an annular multiphase armature coil arranged in said housings and including annular and substantially flat portions at the ends thereof, said multiphase armature coil including a plurality of winding portions arranged equidistantly along the periphery thereof the winding portion for a given phase including an outer peripheral part extending straight outward radially, said outer peripheral part extending straight being held by the inner ends of said housings, the winding portions for the other phases including outer peripheral parts bent in a direction substantially perpendicular to the plane containing said flat annular portions outside thereof;

a shaft supported rotatably by said housings;

a pair of discs of magnetic material fixed on said shaft and arranged on the both sides of said armature coil;

a plurality of magnets fixed on said discs and arranged equidistantly along the periphery of each of said discs in opposed relation to said flat annular portion of said armature coil;

a pair of fans fixed on said discs on the other side thereof with respect to said magnets; and a fan fixed on said shaft and arranged between said pair of discs, said fan including a plurality of blades extending in radial direction; and a plurality of through holes formed in said discs and opened to a space defined by said pair of discs between adjacent ones of said blades.

2. An alternating current generator according to claim 1, wherein each of said through holes is inclined in such a manner that the opening thereof outside of said discs is positioned on the leading side of the rotational direction of the discs as compared with the opening thereof to said space.

3. An alternating current generator according to claim 1 or 2, further comprising a plurality of semicircular protrusions functioning as a blow guide formed in the vicinity of said opening of said through holes outside of said discs, said protrusions being positioned on the lagging side of said openings in the rotational direction of said discs.

4. An alternating current generator according to one of claims 1 and 2, further comprising a pair of annular metal plates in contact with the sides of said armature coil for holding said armature coil therebetween, said metal plates having a plurality of apertures on the outer peripheral portion thereof, through which the bent outer peripheral part of said winding portion is passed.

5. An alternating current generator according to one of claims 1 and 2, further comprising a pair of annular metal plates in contact with the sides of said armature coil for holding said armature coil therebetween, said metal plates having a plurality of apertures on the outer peripheral portion thereof, through which the bent outer peripheral part of said winding portion is passed, said metal plates having a plurality of slits for passing the cooling air, at the part thereof in contact with the flat annular portion of said armature coil.

6. An alternating current generator according to one of claims 1 and 2, further comprising a pair of annular metal plates in contact with the sides of said armature for holding said armature coil therebetween, said metal plates having a plurality of heat-radiating fins extended radially outward of the inner ends of said housings, arranged equidistantly along the outer peripheral direction, and bent substantially at right angles.

7. An alternating current generator according to one of claims 1 and 2, further comprising a pair of annular metal plates in contact with the sides of said armature coil for holding said armature coil therebetween, said metal plates having a plurality of heat-radiating fins extended radially outward of the inner ends of said housings, arranged equidistantly along the outer peripheral direction, and bent substantially at right angles, said heat-radiating fins having a plurality of air holes formed therein.

8. An alternating current generator according to one of claims 1 and 2, further comprising a plurality of spacers of non-magnetic material arranged radially between said magnets and fixed on said discs, said spacers having an axial height smaller than the axial height of said magnets.

9. An alternating current generator according to one of claims 1 and 2, wherein said armature coil is made of a ceramic magnet wire.

10. An alternating current generator according to one of claims 1 and 2, further comprising a shield layer of selected one of heat-resistant synthetic resin and ceramic material for covering said armature coil, and a metal ring in contact with the ends of the outer peripheral portion of said winding portion extending straight, said metal ring holding said armature coil.

11. An alternating current generator according to one of claims 1 and 2, further comprising a shield layer of selected one of heat-resistant synthetic resin and ceramic material for covering said armature coil, and a metal ring in contact with the ends of the outer peripheral portion of said winding portion extending straight, said metal ring holding said armature coil, said metal ring having a U-shaped sectional area at the part thereof in contact with said outer peripheral portion.

12. An alternating current generator comprising:

a pair of cup-shaped housings, each including a plurality of mounting portions at the outer peripheral side thereof, said pair of housings being fixed mutually by said mounting portions, each of said housings further including a plurality of air holes for allowing the cooling air to flow in at the bottom thereof and a plurality of air holes for blowing out the cooling air at the peripheral edge thereof;

an annular multiphase armature coil arranged in said housings and including annular and substantially flat portions at the ends thereof, said multiphase armature coil including a plurality of winding portions arranged equidistantly along the periphery thereof the winding portion for a given phase including an outer peripheral part extending straight outward radially, said outer peripheral part extending straight being held by the inner ends of said housings, the winding portions for the other phases including outer peripheral parts bent in a direction substantially perpendicular to the plane containing said flat annular portions outside thereof;

a shaft supported rotatably by said housings;

a pair of discs of magnetic material fixed on said shaft and arranged on the both sides of said armature coil;

a plurality of magnets fixed on said discs and arranged equidistantly along the periphery of each of said discs in opposed relation to said flat annular portion of said armature coil;

a pair of fans fixed on said discs on the other side thereof with respect to said magnets; and a pair of annular metal plates in contact with the sides of said armature coil for holding said armature coil therebetween.

13. An alternating current generator comprising:

a pair of cup-shaped housings, each including a plurality of mounting portions at the outer peripheral side thereof, said pair of housings being fixed mutually by said mounting portions, each of said housings further including a plurality of air holes for allowing the cooling air to flow in at the bottom thereof and a plurality of air holes for blowing out the cooling air at the peripheral edge thereof;

an annular multiphase armature coil arranged in said housings and including annular and substantially flat portions at the ends thereof, said multiphase armature coil including a plurality of winding portions arranged equidistantly along the periphery thereof the winding portion for a given phase including an outer peripheral part extending straight outward radially, said outer peripheral part extending straight being held by the inner ends of said housings, the winding portions for the other phases including outer peripheral parts bent in a direction substantially perpendicular to the plane containing said flat annular portions outside thereof;

a shaft supported rotatably by said housings;

a pair of discs of magnetic material fixed on said shaft and arranged on the both sides of said armature coil;

a plurality of magnets fixed on said discs and arranged equidistantly along the periphery of each of said discs in opposed relation to said flat annular portion of said armature coil;

a pair of fans fixed on said discs on the other side thereof with respect to said magnets; and a shield layer of a selected one of heat-resistant synthetic resin and ceramic material for covering said armature coil.

14. An alternating current generator comprising:

a pair of cup-shaped housings, each including a plurality of mounting portions at the outer peripheral side thereof, said pair of housings being fixed mutually by said mounting portions, each of said housings further including a plurality of air holes for admitting the cooling air at the bottom therof and a plurality of air holes for flowing out the cooling air at the peripheral edge thereof; and annular multiphase armature coil arranged in said housings and including annular and substantially flat portions at the ends thereof, said multiphase armature coil including a plurality of winding portions arranged equidistantly along the periphery thereof, the winding portion for a given phase including an outer peripheral part extending straight outward radially said outer peripheral part extending straight being held by the inner ends of said housings, the winding portions for the other phases including outer peripheral parts bent in a direction substantially perpendicular to the plane containing said flat annular portions outside thereof;

a pair of annular metal plates in contact with the sides of said armature coil for holding said armature coil therebetween, said metal plates having a plurality of apertures through which the bent outer peripheral parts of said winding portions are passed;

a shaft rotatably supported on said pair of housings;

a pair of discs of magnetic material fixed on said shaft and arranged on the sides of said armature coil;

a plurality of magnets fixed on said discs respectively and arranged along the periphery of said discs in opposed relation with said substantially flat annular portions of said armature coil; and a pair of fans fixed on the other side of said discs with repsect to said magnets;

wherein said metal plates include a plurality of slits for passing the cooling air at the part thereof in contact with said flat annular portions of said armature coil.

15. An alternating current generator according to claim 14, wherein said slits are inclined with respect to the radial direction of said metal plates.

16. An alternating current generator comprising:

a pair of cup-shaped housings, each including a plurality of mounting portions at the outer peripheral side thereof, said pair of housings being fixed mutually by said mounting portions, each of said housings further including a plurality of air holes for admitting the cooling air at the bottom thereof and a plurality of air holes for flowing out the cooling air at the peripheral edge thereof; and annular multiphase armature coil arranged in said housings and including annular and substantially flat portions at the ends thereof, said multiphase armature coil including a plurality of winding portions arranged equidistantly along the periphery thereof, the winding portion for a given phase including an outer peripheral part extending straight outward radially said outer peripheral part extending straight being held by the inner ends of said housings, the winding portions for the other phases including outer peripheral parts bent in a direction substantially perpendicular to the plane containing said flat annular portions outside thereof;

a pair of annular metal plates in contact with the sides of said armature coil for holding said armature coil therebetween, said metal plates having a plurality of apertures through which the bent outer peripheral parts of said winding portions are passed;

a shaft rotatably supported on said pair of housings;

a pair of discs of magnetic material fixed on said shaft and arranged on the sides of said armature coil;

a plurality of magnets fixed on said discs respectively and arranged along the periphery of said discs in opposed relation with said substantially flat annular portions of said armature coil; and a pair of fans fixed on the other side of said discs with respect to said magnets;

wherein said metal plates including a plurality of heat-radiating fins extending radially outward of the inner ends of said housings and arranged equidistantly along the outer peripheral direction, said metal plates being bent substantially at right angles to said metal plates.

17. An alternating current generator according to claim 16, further comprising a plurality of coupling members for coupling said heat-radiating fins to each other, thereby coupling said pair of metal plates to each other.

18. An alternating current generator comprising:

a pair of cup-shaped housings, each including a plurality of mounting portions at the outer peripheral side thereof, said pair of housings being fixed mutually by said mounting portions, each of said housings further including a plurality of air holes for allowing the cooling air to flow in at the bottom thereof and a plurality of air holes for blowing out the cooling air at the peripheral edge thereof;

an annular multiphase armature coil arranged in said housings and including annular and substantially flat portions at the ends thereof, said multiphase armature coil including a plurality of winding portions arranged equidistantly along the periphery thereof the winding portion for a given phase including an outer peripheral part extending straight outward radially, said outer peripheral part extending straight being held by the inner ends of said housings, the winding portions for the other phases including outer peripheral parts bent in a direction substantially perpendicular to the plane containing said flat annular portions outside thereof;

a shaft supported rotatably by said housings;

a pair of discs of magnetic material fixed on said shaft and arranged on the both sides of said armature coil;

a plurality of magnets fixed on said discs and arranged equidistantly along the periphery of each of said discs in opposed relation to said flat annular portion of said armature coil;

a pair of fans fixed on said discs on the other side thereof with respect to said magnets; and further comprising a fan fixed on said shaft and arranged between said pair of said discs, said fan having a plurality of blades extending in radial direction, and a plurality of through holes formed in said discs for passing the cooling air.

19. An alternating current generator according to claim 18, wherein said through holes are formed inclined in said discs in such a manner that the openings on the armature-coil side of said through holes are positioned on the lagging side of the rotational direction of said discs as compared with the openings thereof on the other side of said through holes.

20. An alternating current generator according to claim 19, further comprising a plurality of semicircular protrusions functioning as a blow guide formed in the vicinity of said openings on the other side of said through holes with respect to said armature coil, said protrusions being formed on the lagging side of the openings in the rotational direction of said discs.

* * * * *